Jan. 31, 1928.
A. J. DREES ET AL
1,657,792
BOTTLE FILLER
Filed April 28, 1926 4 Sheets-Sheet 2
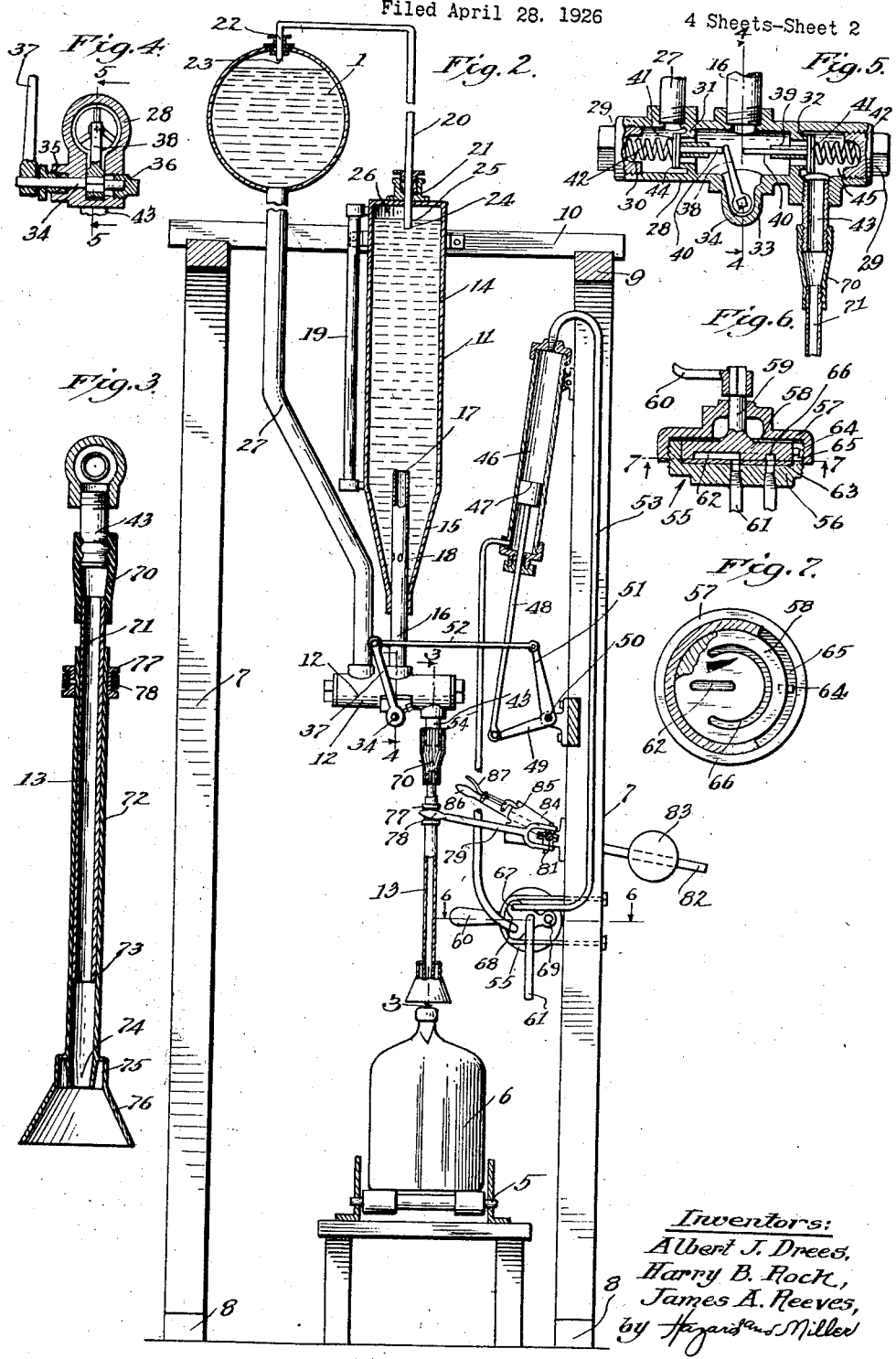
Inventors:
Albert J. Drees,
Harry B. Rock,
James A. Reeves,
by Hazard and Miller
Attorneys.

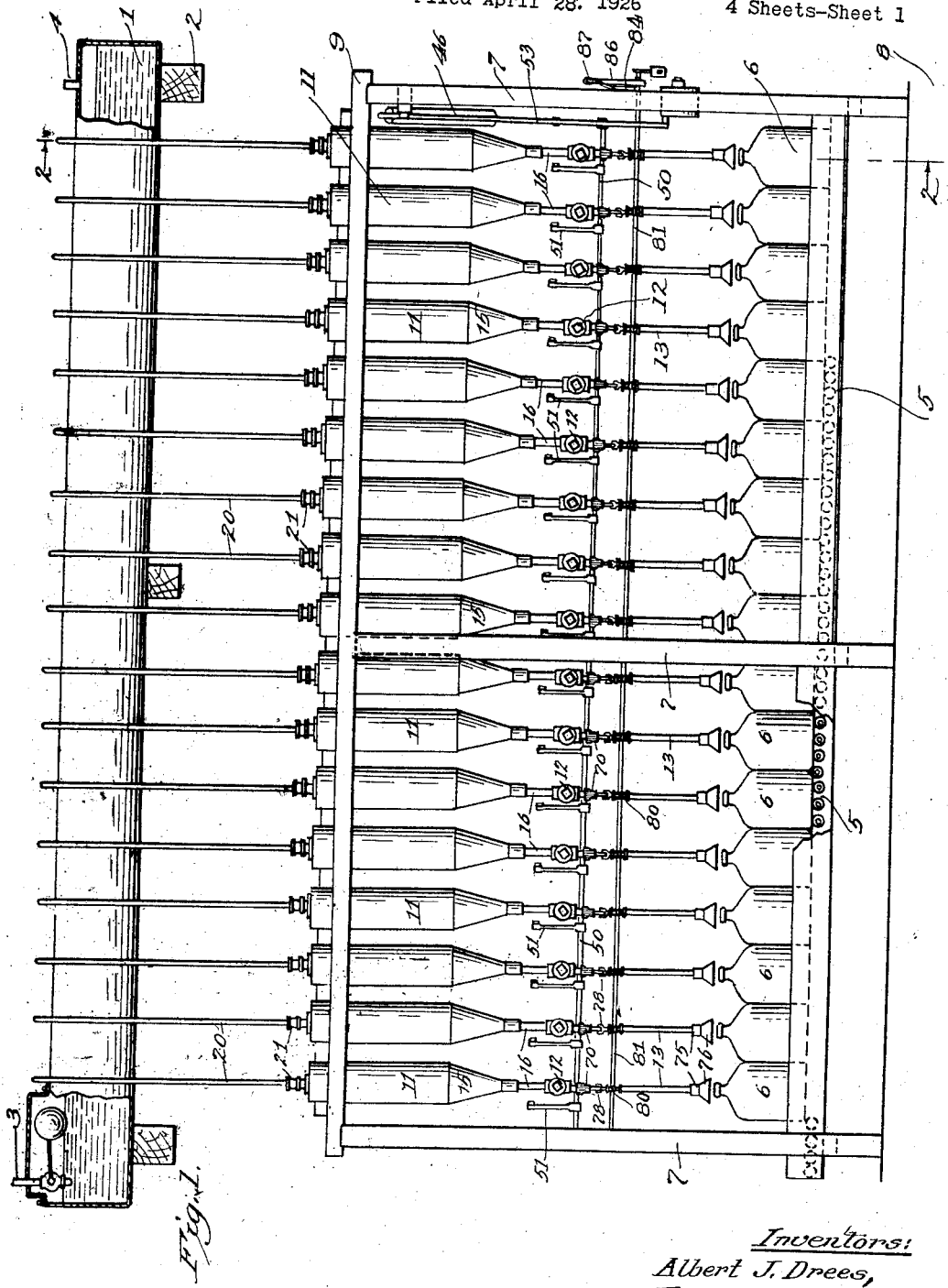

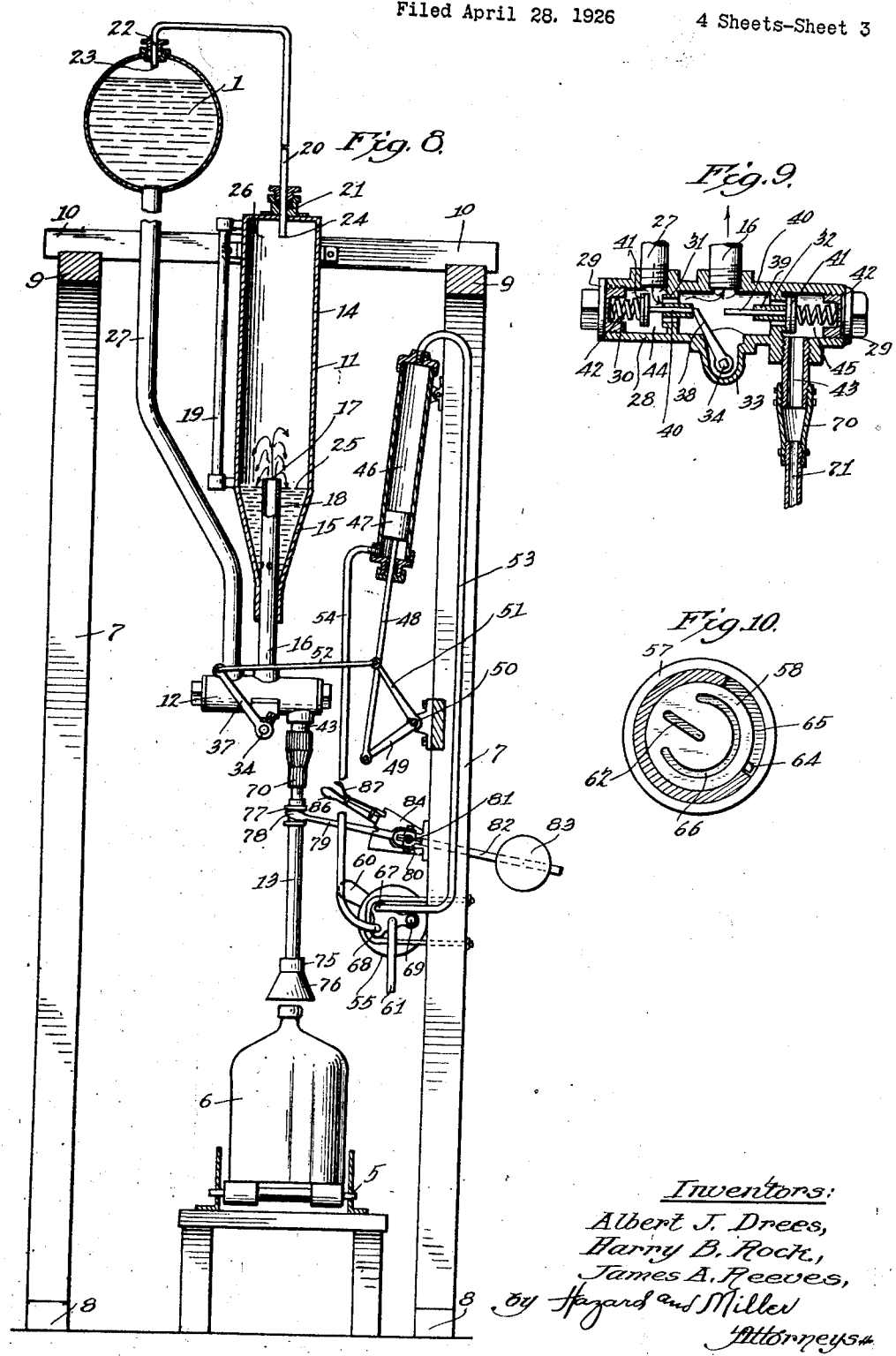

Jan. 31, 1928.
A. J. DREES ET AL
1,657,792
BOTTLE FILLER
Filed April 28, 1926
4 Sheets-Sheet 4
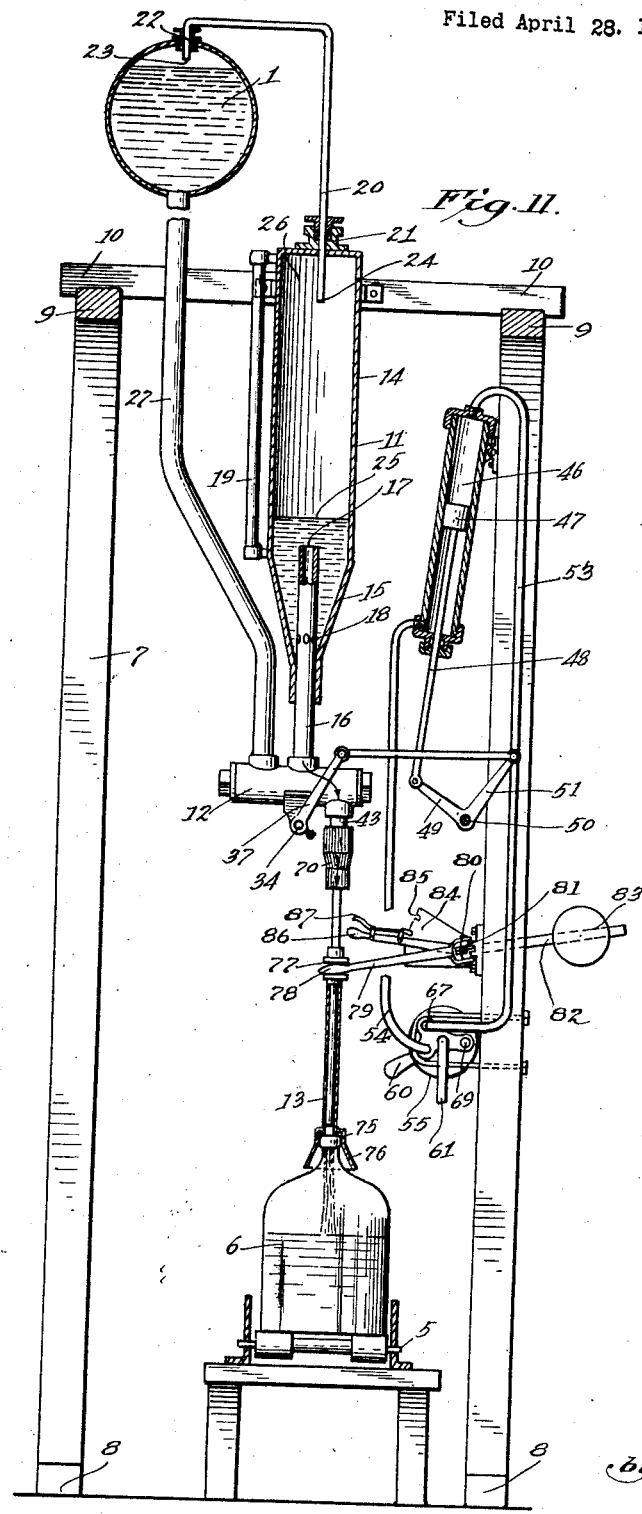
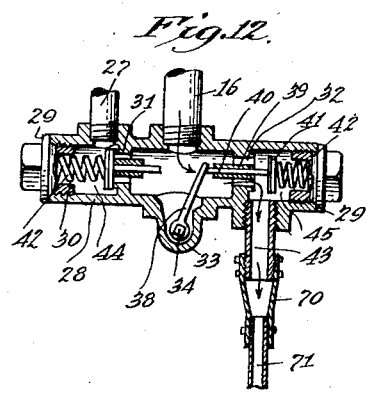
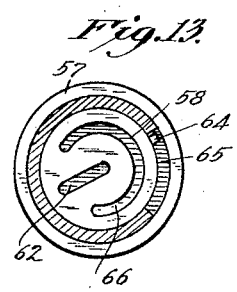
Inventors:
Albert J. Drees,
Harry B. Rock,
James A. Reeves,
by Hazard & Miller
Attorneys Patented Jan. 31, 1928.

UNITED STATES PATENT OFFICE.

ALBERT J. DREES, HARRY B. ROCK, AND JAMES A. REEVES, OF LOS ANGELES, CALIFORNIA, ASSIGNORS TO L. A. ICE AND COLD STORAGE COMPANY, OF LOS ANGELES, CALIFORNIA, A CORPORATION OF DELAWARE.

BOTTLE FILLER.

Application filed April 28, 1926. Serial No. 105,119.

Our invention is a bottle filler comprising a machine to fill a plurality of bottles simultaneously with a substantially same and exact amount of liquid.

A main object of our invention is the construction of a machine which will fill a plurality of large bottles simultaneously with liquid, the bottles having a similar capacity and being filled with similar amounts, these amounts being substantially accurate for each bottle.

Another object of our invention is to provide a machine which may be easily manipulated, being controlled preferably by one operator and filling the bottles in an expeditious manner.

A further object of our invention is to position a bank of bottles to be filled in a row, in alinement with the machine and by means of a common rock shaft, raise and lower bottle filling tubes, and by means of a commonly operated power mechanism, open a plurality of valves for charging the various bottles with the requisite amount of liquid.

Another object of our invention is to provide a main storage tank with a liquid and a plurality of individual measuring vessels, there being one of such vessels for each bottle and the production of adjustable mechanism by which a substantially accurate amount of liquid may be measured to flow automatically into a measuring vessel and from the measuring vessel into the distributing bottles. Thus a more detailed object of our invention is to flow a liquid from a main storage tank into a plurality of accurate measuring vessels, this being done through a series of valves operated simultaneously and after the measuring vessels are filled by further manipulation of the valves, to charge the bottles used for distributing the liquid after lowering the filling tubes.

A detailed object of our invention is in the various structural elements which enter into the plant.

In our invention we utilize a suitable framework with a large elongated storage tank placed above same, to which water may be supplied as required. A suitable track having a conveyor or the like for bottles, runs lengthwise of the machine considerably below the storage tank. A plurality of individual measuring vessels are positioned in the framework, having a pipe leading into the bottom of such vessels. A series of pipes lead downwardly from the main storage tank to a series of valves, there being one valve for each measuring vessel and in each valve a filling tube depends downwardly, there being one filling tube for each bottle. The filling tubes are flexibly connected to the valves to allow slight adjustment if the bottles are not positioned with the exact regularity.

The valves are duplex valves adapted when in one position to flow water from the main storage tank to the measuring vessels and when shifted into another position to run the water by gravity out of the measuring vessels into the bottles, the filling tubes in the meantime having been lowered on the neck of the bottles. The filling tubes are handled simultaneously by a rock shaft manually operated and a series of valves are operated by a series of cranks mounted on a common shaft, these cranks being shifted by a single power mechanism manually controlled. An adjustable vent tube in each measuring vessel allows accurate adjustment of the quantity of water fed into each measuring vessel and a discharge pipe is provided with a plurality of aperatures below the inlet orifice in order to slow up the filling of the bottles when they are nearly filled.

Various structural details will appear from the following description in connection with the drawings, in which;

Figure 1 is a front elevation of our machine, illustrating the bottles positioned to be filled with the filling tubes raised;

Fig. 2 is a vertical cross section of Fig. 1, on the line 2—2 in the direction of the arrows. This figure indicates the measuring vessels filled to the desired capacity as the valves leading from the storage tank are being shut off and before the filling valves are opened;

Fig. 3 is a vertical section on the line 3—3 of Fig. 2, in the direction of the arrows, showing a filler tube in longitudinal section;

Fig. 4 is a vertical section on the line 4—4 of Figs. 2 and 5, in the direction of the arrows, through a duplex valve;

Fig. 5 is a section on the line 5—5 of Fig. 4, in the direction of the arrows, being a longitudinal section of the valve;

Fig. 6 is a sectional view on the line 6—6 of Fig. 2, of a compressed air control valve for regulating the operation of the duplex liquid valve;

Fig. 7 is a section of Fig. 6, on the line 7—7 in the direction of the arrows;

Fig. 8 is a section similar to Fig. 2, showing the duplex valves in the position for filling the measuring vessels in the initial filling stage and with the filling tubes raised, each set filling a bank of bottles before such bottles have been moved out of the way;

Fig. 9 is a view similar to Fig. 5, showing a duplex liquid valve in the position for filling the measuring vessels;

Fig. 10 is a view similar to Fig. 7, showing the air valve in the position for operating the air power mechanism to move and hold the duplex valves in the position of Fig. 9;

Fig. 11 is a view similar to Figs. 2 and 8, showing the filling tubes lowered on the bottles, the duplex valves in the position for discharging water from the measuring vessels to the bottles, and the air control valve and power cylinder operated thereby in the position for moving and holding the duplex valves in the discharging position;

Fig. 12 is a view similar to Figs. 5 and 9, with a duplex valve in the discharging position;

Fig. 13 is a view similar to Figs. 7 and 10, with the air control valve positioned to pass the air into the power cylinder at the lower end thereof, to hold the duplex valve in the position of Fig. 12.

Our general plant is substantially as follows, having reference particularly to Fig. 1:

A storage tank 1 is supported at any suitable elevation on cross-beams 2; this tank having a supply pipe 3 from a much larger storage tank. The tank also has an air vent 4. Such tank extends the full length of the machine to accommodate the bank of bottles to be filled.

A suitable conveyor 5 is positioned near the base of the machine and is adapted to convey a plurality of bottles 6 positioned closely adjacent each other, such bottles being in substantial contact or being spaced by crates if desired. The particular machine illustrated is for charging five gallon bottles with water.

A suitable framework is constructed with posts 7 built on a foundation 8 and having longitudinal caps 9 with cross-bars 10 at suitable intervals. A series of measuring vessels 11 are suitably supported from the cross-bars or other suitable structure. A series of duplex water valves 12 are positioned below the filling vessels to discharge water through the filling tubes 13 into the bottles.

The detailed mechanism for filling the measuring vessels is substantially as follows, having reference particularly to Figs. 2, 8 or 11:

The measuring vessels 11 preferably have a cylindrical upper portion 14 and a tapered lower portion 15. A pipe 16 extends upwardly through the bottom of each of these vessels, having an open orifice 17 at the top and a plurality of apertures 18 some little distance below the orifice. A gauge glass 19 is provided for each measuring vessel. An adjustable calibrating vent tube 20 of small bore fits through an adjustable packing bushing 21 in the top of the vessel and through an adjustable packing gland 22 into the top of the storage tank. The end 23 of such tube in the storage tank is designed to be always above the water level of such main tank and the end 24 in the measuring vessel is designed to be adjusted to extend slightly below the liquid level 25 in such measuring vessels, leaving a slight air space 26 thereabove.

The flow of water is regulated from the main storage tank to the plurality of measuring vessels by means of duplex valves having reference particularly to Figs. 2, 8 or 11, and 4, 5, 9 and 12. A series of discharge pipes 27 lead downwardly from the storage tank 1 to the duplex valves 12. Such valves have a substantially cylindrical body 28 closed at opposite ends by closure plugs 29 having wrench heads and sockets 30 therein. A pair of valve seats 31 and 32 are suitably positioned in the valve. A dome 33 is formed on one side of the valve preferably the base and has a cross-rock shaft 34 extending through the dome and journaled in the structure thereof. This rock shaft is provided with a suitable packing 35 to prevent leakage at one end, and with a closure plug 36 at the other; an operating arm 37 being mounted on the exposed end of the shaft. A rocking finger 38 is rigidly attached to the rock shaft on the inside of the dome, extending inside the body of the valve.

A plurality of slideways 39 are provided in the body of the valve to accommodate valve plungers 40, these plungers having suitable reciprocating valves 41 on their end, the valves being adapted to engage the outside faces of the valve seats and are pressed inwardly by compression springs 42 bearing in the sockets 30 of the plugs 29. It will be noted that the pipe 16 leading to the measuring vessel is attached to the upper side of the valve body substantially over the dome and that a discharge nipple 43 is connected to the lower part of the body at the opposite end to the inlet pipe 27.

Referring particularly to Figs. 5, 9, and 12, it will be seen that the valves are duplex. The end at the inlet pipe 27 may be designated as the filling valve, designated by the numeral 44 and the end at the nipple 43 as the discharge valve, designated by the numeral 45 in that the first valve operates to fill a measuring vessel and the latter valve to discharge from said vessel into a bottle.

The duplex valves are operated by a power mechanism substantially as follows, having reference particularly to Figs. 1, 2, 8 and 11, and detail figures 6, 7, 10 and 13:

A single power cylinder 46 is swivelly mounted preferably on one of the legs 7 to allow slight swivelling action and carries a reciprocating piston 47 with a piston rod 48 therein. This rod is pivotally connected to an arm 49, the latter being connected to a crank operating shaft 50 extending longitudinally of the machine. A plurality of cranks 51 are keyed on this crank shaft and connected by links 52 to the arms 37 of the duplex valves.

Air pipes 53 and 54 lead from opposite ends of the power cylinder to an air control valve 55. This air control valve 55 is illustrated in detail in Figs. 6, 7, 10 and 13. The valve body 56 is in the form of a disc with a cap 57 preferably screw threaded thereon. A rotatable valve 58 has the stem 59 journaled in the cap, the stem being operated by an operating handle 60. An air inlet pipe 61 which is connected to any suitable source of compressed air leads to a radial groove 62 in the valve 58, there being preferably a suitable valve seat 63 on which the disc-like valve bears in its rotation. A projecting finger 64 operates in an arcuate socket 65 to restrict the rotary motion of the valve. An arcuate groove 66 is formed concentric to the inlet 61 and continues partly around the valve.

The arrangement of the radial groove and the arcuate groove 66 is such that when the valve is in the position shown in Fig. 7 the inlet is not connected with either of the ports 67 or 68 connected respectively with the pipes 53 and 54 leading to the power cylinder. When the valve is turned in the position of Fig. 10, the radial groove 62 is connected with the port 67 and with the pipe 53 leading to the upper end of the cylinder 46, thereby driving the piston downwardly and rocking the duplex valve finger 38 to open the filling valve 44. The discharge through the pipe 54 leads through the ports 68 to the arcuate groove 66 and thence through the discharge port 69 leading to the atmosphere.

When the air valve is reversed into the position of Fig. 13, the compressed air is lead by the radial groove 62 to the port 68, pipe 54, and the lower end of the power cylinder forcing the piston upwardly and rocking the duplex valve finger into the position shown in Fig. 12, opening the discharge valve 45 and allowing the closure of the filling valve 44. From the above description it will be seen that the operation of the single air valve and the single power cylinder controls the operation of all the duplex liquid valves.

The construction and operation of the filling tubes 13 is substantially as follows, having reference particularly to Figs. 1, 2, 3, 8 and 11.

Each of these tubes has a flexible connection 70 formed preferably by a section of rubber hose with the nipples 43, and connects to an inner stationary pipe 71. An outer sliding pipe 72 is telescopically mounted on the inner pipe so as to slide freely thereon, the stationary pipe 72 having its discharge end 73 above the lower end of the outer pipe. This outer pipe is provided with a nozzle 74 adapted to fit in the neck of the bottle and with a flange 75 adapted to extend over the top of the bottle, the flange having a flared skirt 76 to act as a centering arrangement to guide the nozzle into the bottles, on the lowering of the outer tube as hereunder described.

It will be understood that the bottles may not be spaced absolutely accurately by the conveying mechanism and therefore it is necessary to provide the flexible connection 70 and the guiding arrangement 76 so that if the bottles are slightly off center in regard to the duplex valves, the nozzles 74 will be properly guided in position.

The mechanism for simultaneously raising and lowering the outer tubes is substantially as follows, having reference particularly to Figs. 1, 2, 3, 8 and 11:

Each of the outer tubes is provided with a collar 77 which is engaged by a yoke 78 connected to yoke arms 79. These arms are attached to a swivel 80 and the opposite part of the swivel is rigidly connected to a rock shaft 81. This rock shaft has at one end a counter-weight arm 82 connected therewith and a counter-weight 83. A segment 84 is mounted in a fixed position at some suitable part of the machine, preferably at the ends as indicated in Fig. 1, and is provided with a series of notches 85. An operating handle 86 having a spring actuated detent 87 adapted to engage the grooves 85 is rigidly attached to the rock shaft 81 and may move over the segment. The counter-weight is designed to substantially balance the series of yoke arms 79 and the outer sliding tubes and the operating handle.

The operation of the mechanism immediately above described is substantially as follows:

When the yoke arms are in their upper position and the operating handle in the upper position as shown in Figs. 2 and 8, the outer tube is raised above the bottles so that the bottles may be fed either to or from the machine underneath the skirts 76. When the yoke arms and operating handle are lowered into the position of Fig. 11, the nozzle 74 is fitted into the bottles and the machine is properly connected to fill the bottles.

The general operation of the machine is substantially as follows:

It will be understood from the above description that by control of the duplex valves simultaneously water or other liquid may be fed from the main storage tank to the measuring vessels. In order to accurately gauge the amount of liquid these vessels contain, the calibrating tube 20 may be raised or lowered. When it is lowered it increases the size of the air pocket 26 and may be positioned to stop the flow of filling liquid at any desired position. Therefore by properly adjusting the calibrating tube an accurate measuring of the liquid may be obtained. It is not necessary that this tube be raised and lowered in the main tank 1, as a flexible tube may be utilized, it being essential however, that the tube may readily be raised and lowered in each of the filling vessels.

In the general operation of the machine the duplex valve is preferably operated to fill the measuring vessels while the bottles are being fed to and centered in the machine, and before operating the air valve to discharge the measuring vessels the rock shaft is operated to lower the telescopic outer tube of the filler tube on to the bottles. Then by control of the air valve the duplex liquid valve is reversed.

The liquid flows out quickly through the orifice 17 in the pipe 16 until the level of such orifice is reached and then more slowly through the apertures 18. These are positioned relatively so that as the bottles are nearly filled the rate of filling is materially slowed up, hence preventing splashing. As soon as the bottles are filled and the sliding outer filling tube raised the bank of bottles may be removed and the measuring vessels again filled, the above cycle of operations being repeated.

Our invention as above described has been indicated as being suitable for filling water into large bottles in a quick operation. However, it will be apparent that it may be utilized for other liquids and may be utilized to fill cans or the like.

The various structural features and specific details may be considerably altered to suit different circumstances. Such changes, however, would be within the spirit of our invention as set forth in the description, drawings and claims.

Having described our invention, what we claim is:

1. In a bottle filler, a measuring vessel having a pipe extending upwardly through the lower end. the said vessel being tapered at the bottom, the pipe having a central orifice and a plurality of apertures positioned below the orifice, and a calibrating tube adjustably mounted in the upper part of the measuring vessel.

2. A bottle filling machine comprising in combination an overhead tank, a plurality of measuring vessels tapered at their lower ends and having pipes each with an open orifice at the top and with apertures thereblow, a plurality of valves, each valve being connected to the tank and to the pipe of a measuring vessel, a stationary filler tube depending from each valve, each valve having a pair of slidable valve elements engaging seats, and means to actuate said valves and valve elements simultaneously to flow liquid from the tank to the vessels, shutting off the filler tubes, and from the vessels to the filler tubes, shutting off the tank.

3. In a bottle filler a measuring vessel tapered at its lower end, a pipe extending upwardly through the lower end, the pipe having a central orifice at the top, and a plurality of apertures adjacent the bottom of the vessel.

4. In a bottle filler a measuring vessel having a pipe extending upwardly through the lower end, the said vessel being tapered at the bottom, the pipe having a central orifice and a plurality of apertures positioned below the orifice, a tank, means connecting the tank to the pipe to fill the vessel, and the valve for controlling said means, and a calibrating tube adjustably mounted in the upper end of the vessel and the upper part of the tank.

In testimony whereof we have signed our names to this specification.

ALBERT J. DREES.
HARRY B. ROCK.
JAMES A. REEVES.